Figure 1:
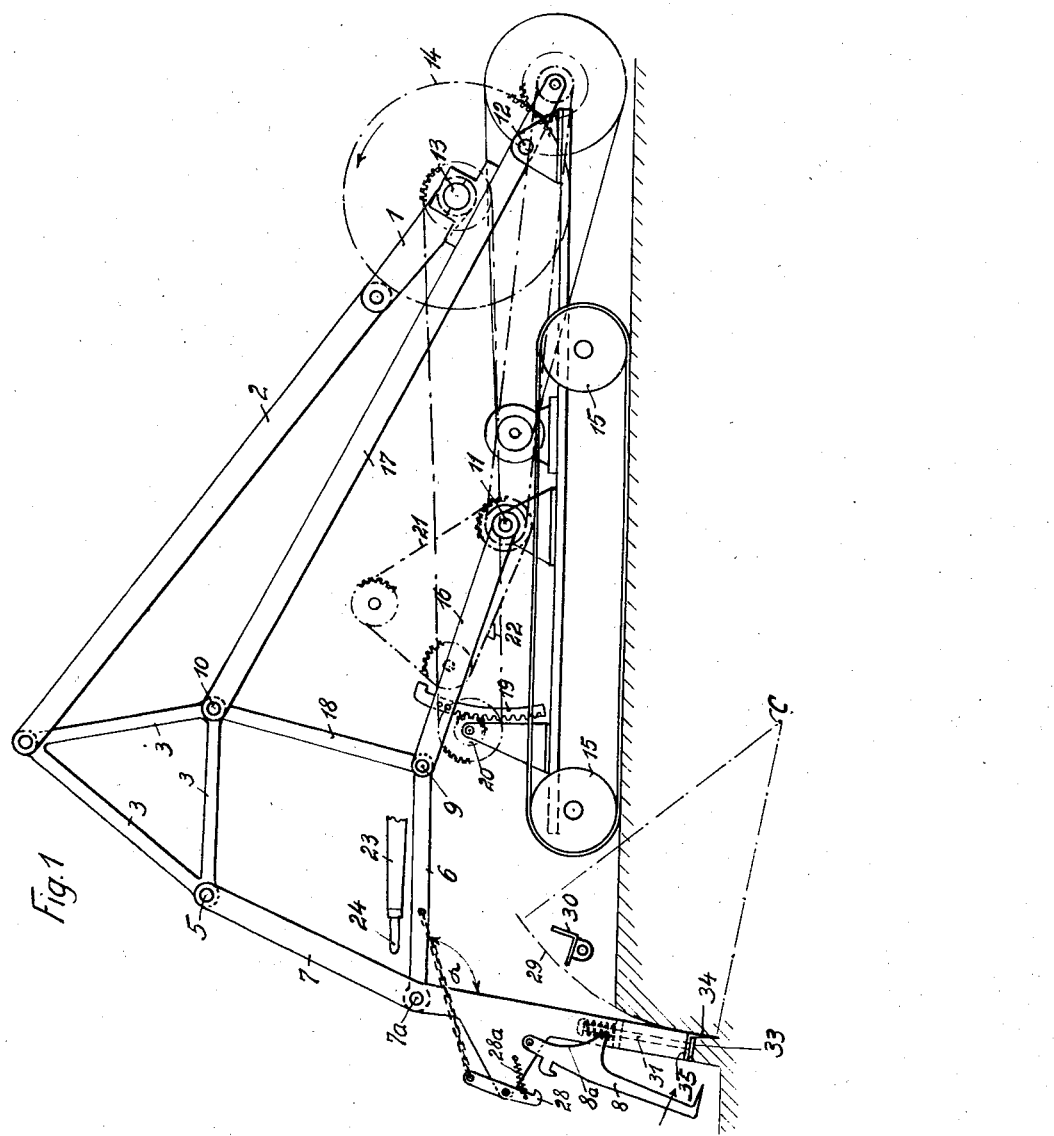

Fig. 2

May 7, 1940.　　　　J. STEINERT　　　　2,200,137
MACHINE FOR CUTTING, LIFTING, AND CONVEYING PEAT SODS
Filed Nov. 21, 1938　　　9 Sheets-Sheet 3
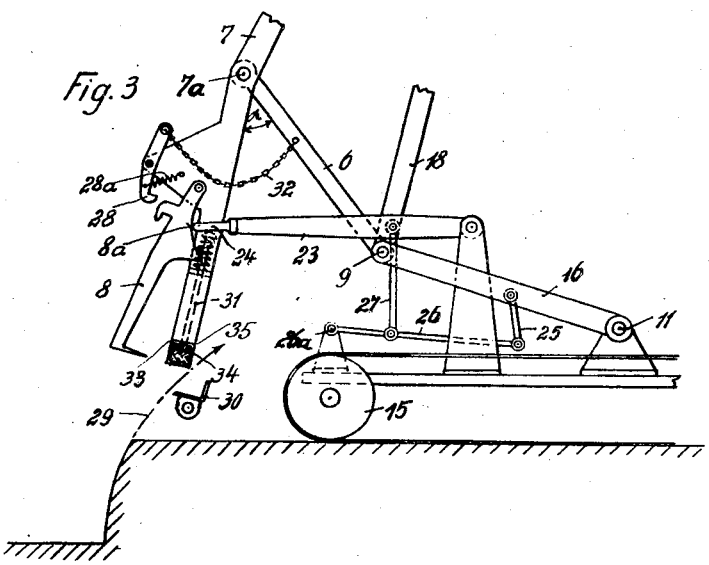
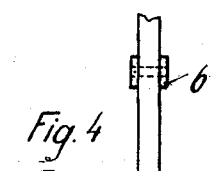
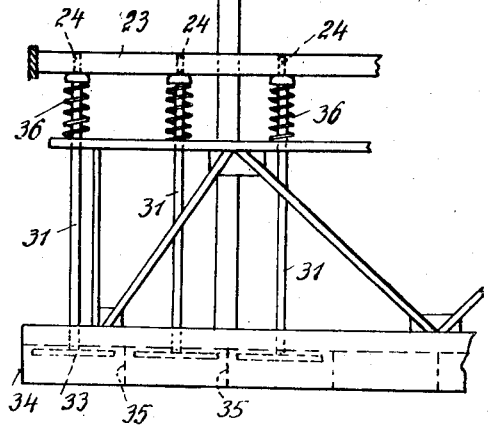
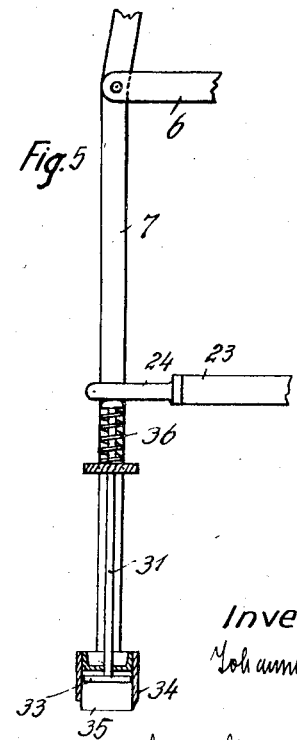

May 7, 1940.  J. STEINERT  2,200,137
MACHINE FOR CUTTING, LIFTING, AND CONVEYING PEAT SODS
Filed Nov. 21, 1938  9 Sheets-Sheet 4
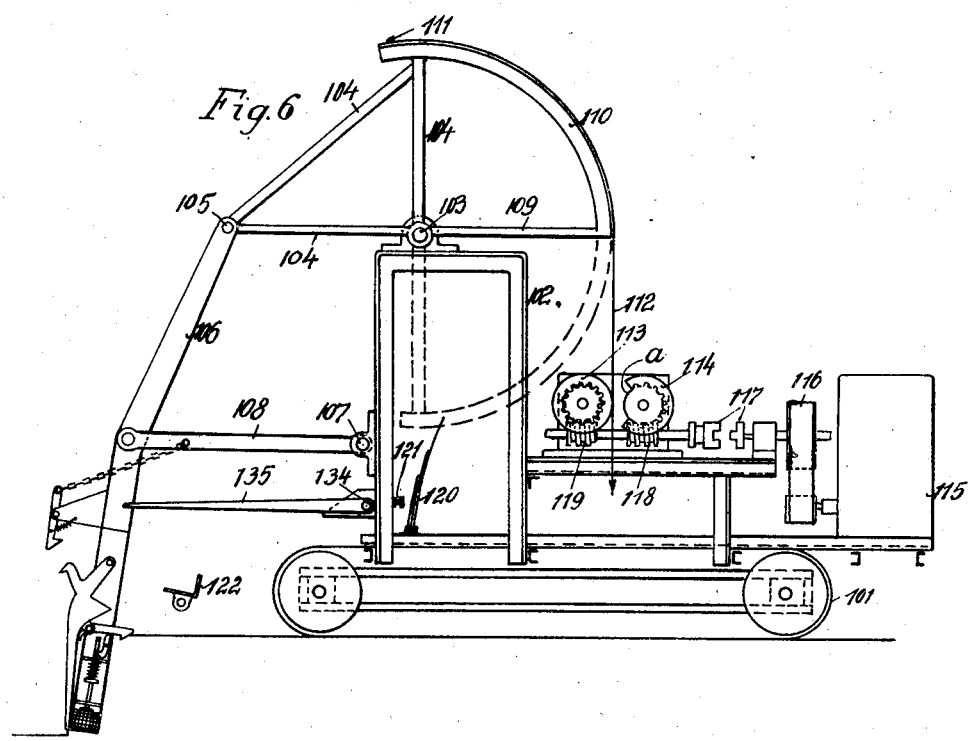
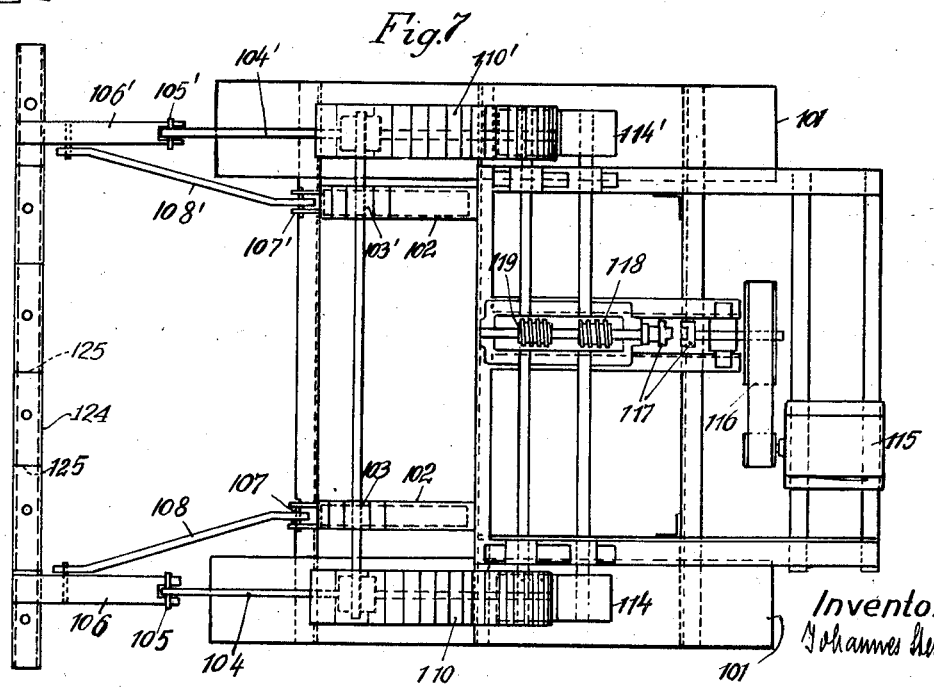
Inventor
Johannes Steinert
By Dezso Steinert
Attorney

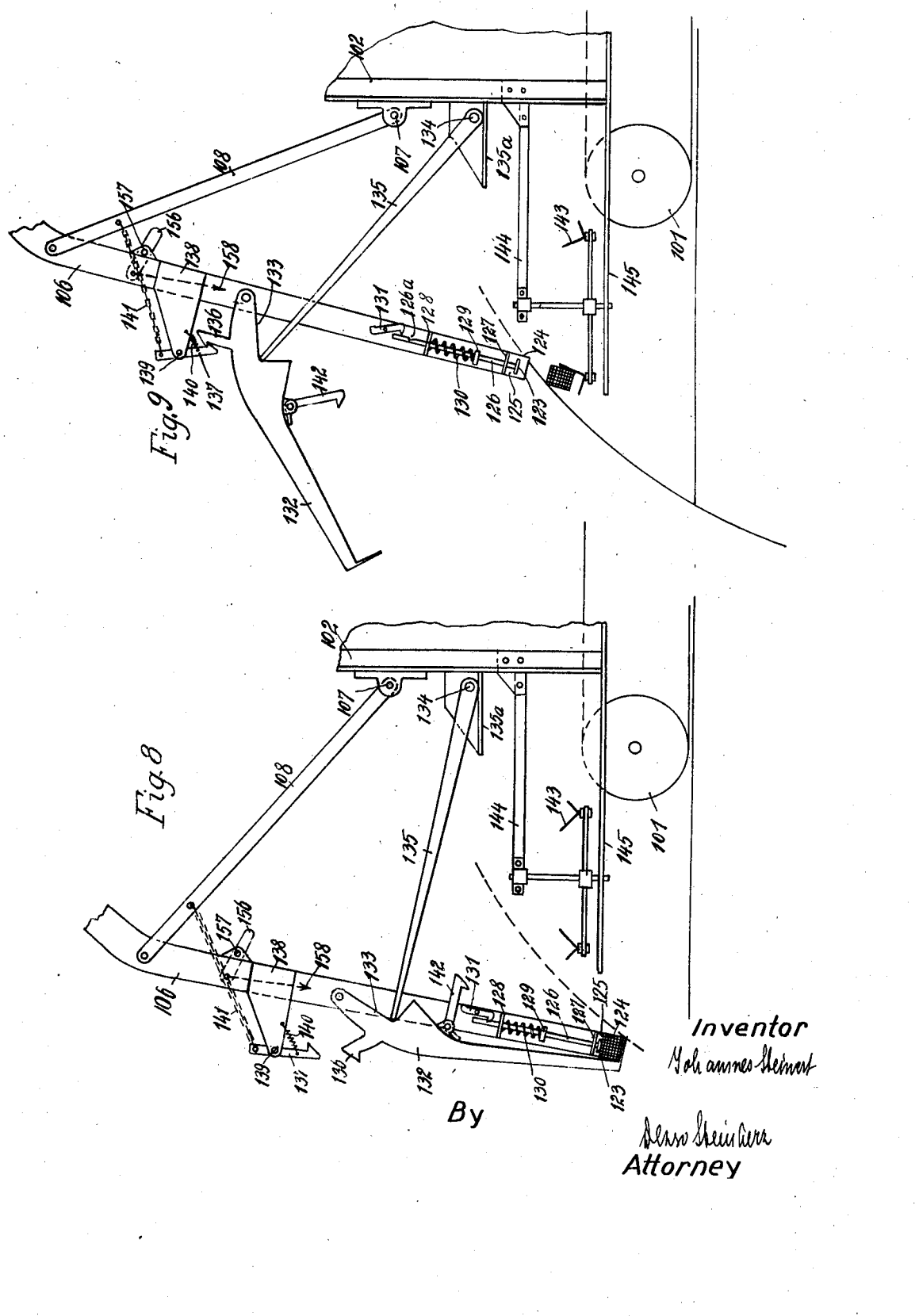

May 7, 1940.　　　　J. STEINERT　　　　2,200,137
MACHINE FOR CUTTING, LIFTING, AND CONVEYING PEAT SODS
Filed Nov. 21, 1938　　　9 Sheets-Sheet 6
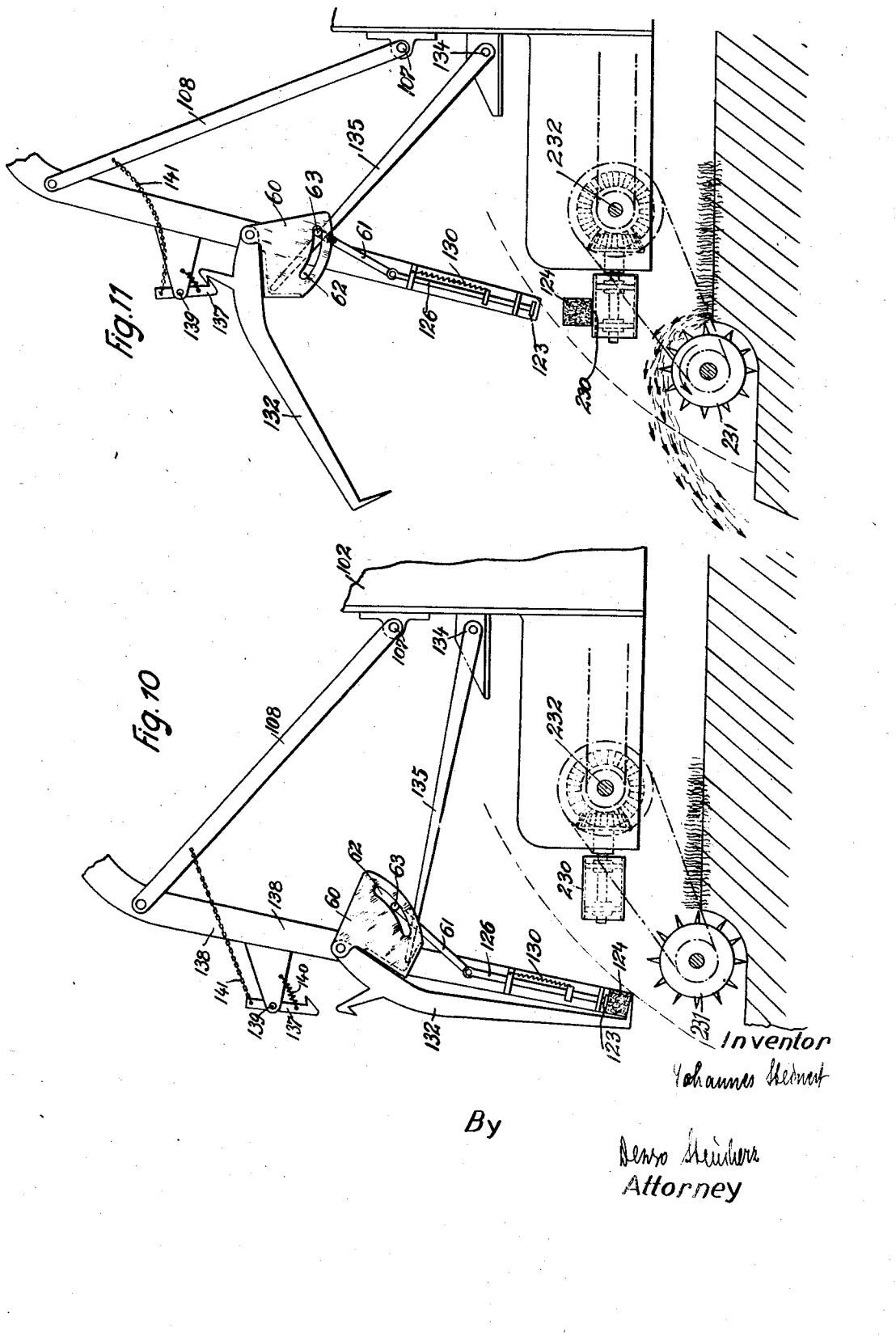

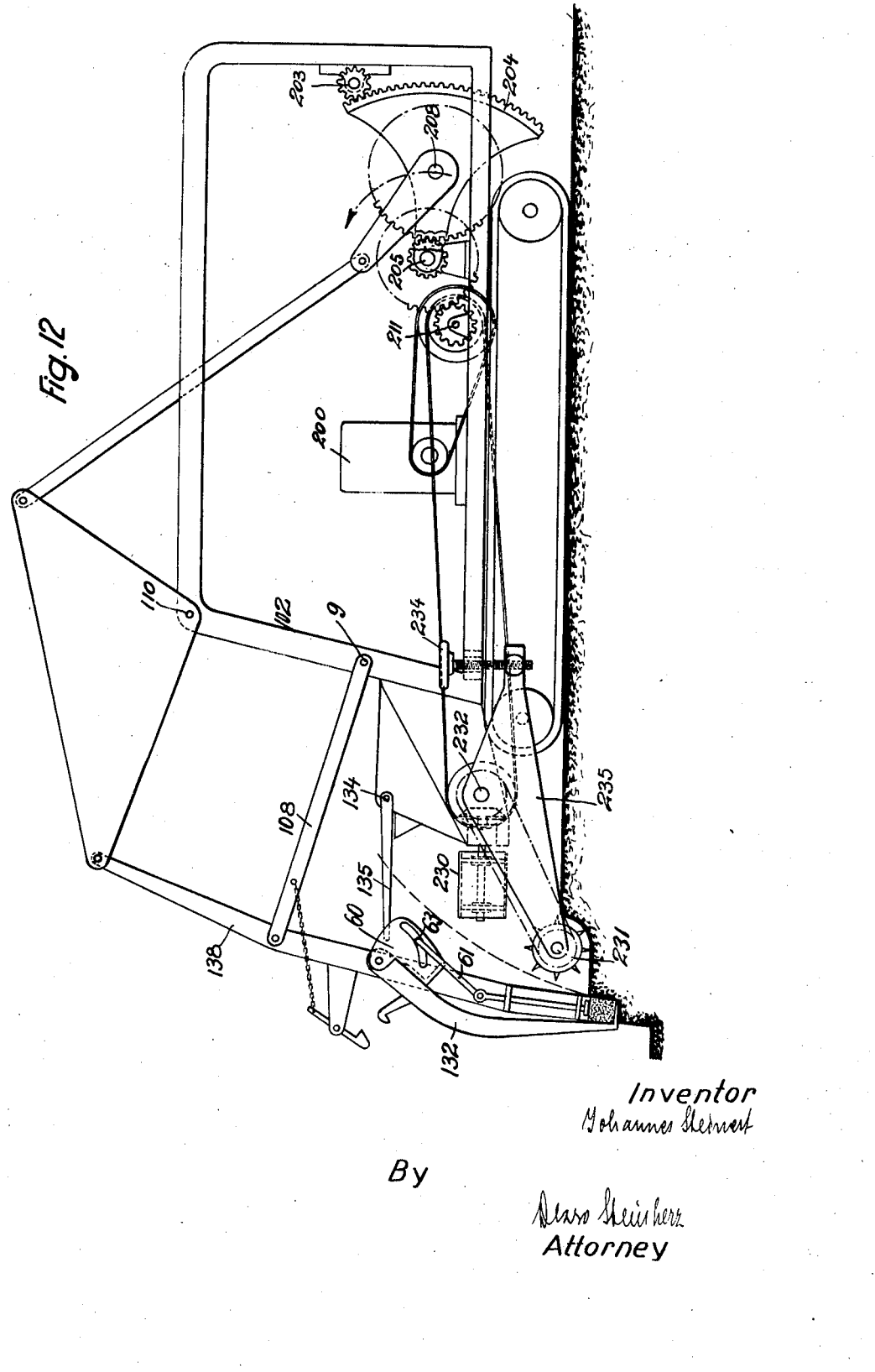

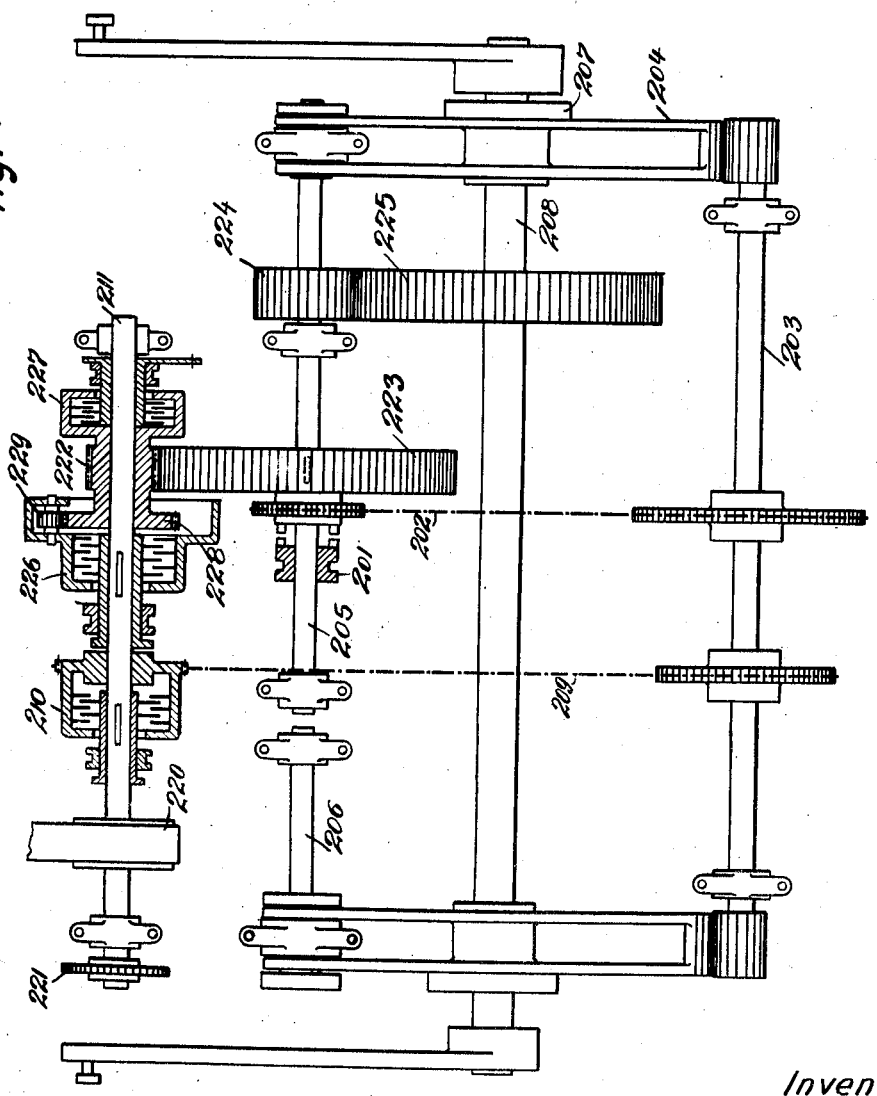

Patented May 7, 1940

2,200,137

UNITED STATES PATENT OFFICE 2,200,137

MACHINE FOR CUTTING, LIFTING, AND CONVEYING PEAT SODS

Johannes Steinert, Hanover, Germany, assignor to Eduard Dyckerhoff, Bluemnau, near Wunstorf, Germany Application November 21, 1938, Serial No. 241,591
In Germany December 2, 1937

21 Claims. (Cl. 37—3)

My invention relates to a machine for cutting, lifting and conveying peat sods, and more particularly to a machine provided at its front end with a cutter system having horizontal and vertical knives adapted to cut one horizontal and three vertical sides of the peat sods.

In the hitherto known machines of above described type the cutting operation is carried out on a more or less vertical straight line. If, after the cutting operation, the cut sods are conveyed by raising the cutter device, then for ejecting the sods over a delivery device, the entire cutter system has to be swung rearwardly. After the ejecting operation, the system must then be returned to a position in which the next cutting operation is possible. This sequence of movements requires an extremely complicated driving mechanism, quite apart from the fact that the necessary working operations require time, whereby the output of the machine suffers.

One object of my invention is to provide a machine of above described type, in which the cutting operation is carried out on a path of a continuous curve one end of which lies above the conveyer device and the center of curvature of which is situated in the mass of peat below the machine, so that a special additional swinging movement of the cutter system for the ejection of the sods becomes unnecessary.

Another object of my invention is to provide a machine, in which the cutter system on its downward movement is first given mechanically an accelerated movement, whereafter, upon reaching the maximum speed obtainable by its drive, said cutter system is disconnected from said drive so that the movement of said cutter system is accelerated further by its own weight, and in which the magnitude of the acceleration is adjustable, so that the peat cut will always have a constant height.

Still another object of my invention is to provide a machine, in which the cutter system on its downward movement is accelerated by means of an additional force.

A further object of my invention is to provide a machine, in which the cut sods may be automatically ejected from the cutter system.

Still another object of my invention is to provide a machine, in which the ejecting devices for the ejection of the cut sods are operated at constant height, so that the sods cannot be damaged by excessive height of fall from the cutting system into the conveyer device.

Another object of my invention is to provide a machine, in which the operation of the ejecting device may also be effected in dependence on the position of the horizontal cutter of the cutter system.

A further object of my invention is to provide a machine, in which the horizontal knife of the cutter system is pivoted to the beam carrying the cutter system and, during the upward movement of the cutter system, the means actuating the ejecting devices also serve to rotate the horizontal knife into a position in which it becomes engaged with a locking device.

Still another object of my invention is to provide a machine, in which during the downward movement of the cutter system the horizontal cutter is automatically disengaged from the locking device holding same in an elevated position.

Another object of my invention is to provide a machine, in which the cutter system may be adjusted downwardly by the depth of a sod after the first cutting operation.

Still another object of my invention is to provide a machine, in which the upward and downward movement of the entire cutter driving system may, in accordance with the position of the layer of sods to be cut, be obviated.

A further object of my invention is to provide a machine of above described type, which is provided with additional means for the removal of the so-called "ling" ground (waste), i. e. the top layer of the bog overgrown with grass and heather.

In order to carry out my invention into practice, I provide a machine for cutting, lifting and conveying peat sods, comprising a cutter system consisting of horizontal and vertical knives adapted to cut one horizontal and three vertical sides of the peat sods, a movable beam carrying said cutter system at one end thereof, a mechanism connected to said beam for causing upward and downward movements of said cutter system, and guiding means connected to an intermediate point of said beam, said guiding means being adapted to guide said cutter system during said upward and downward movements in a path of a continuous curve one end of which lies above a conveyer device and the center of curvature of which is situated in the mass of peat below the machine. In a preferred embodiment of my invention the machine comprises a bell-crank lever actuating the beam carrying the cutter system, one arm of said bell-crank lever being connected to said beam, a crank-mechanism, a second arm of said bell-crank lever being connected to said crank-mechanism, a driving device, a freewheel-mechanism being arranged between said driving device and said crank-mechanism, said crank-mechanism being adapted to impart an accelerated movement to said cutter system during the first part of its downward movement, said freewheel-mechanism being adapted to release said crank-mechanism from said driving device when said cutting system has reached the maximum speed obtainable by said crank-mechanism, whereby the movement of the cutter system is accelerated further by its own weight, and a regulating brake operatively associated with the crank-mechanism for the adjustment of the magnitude of the acceleration.

Figure 13:
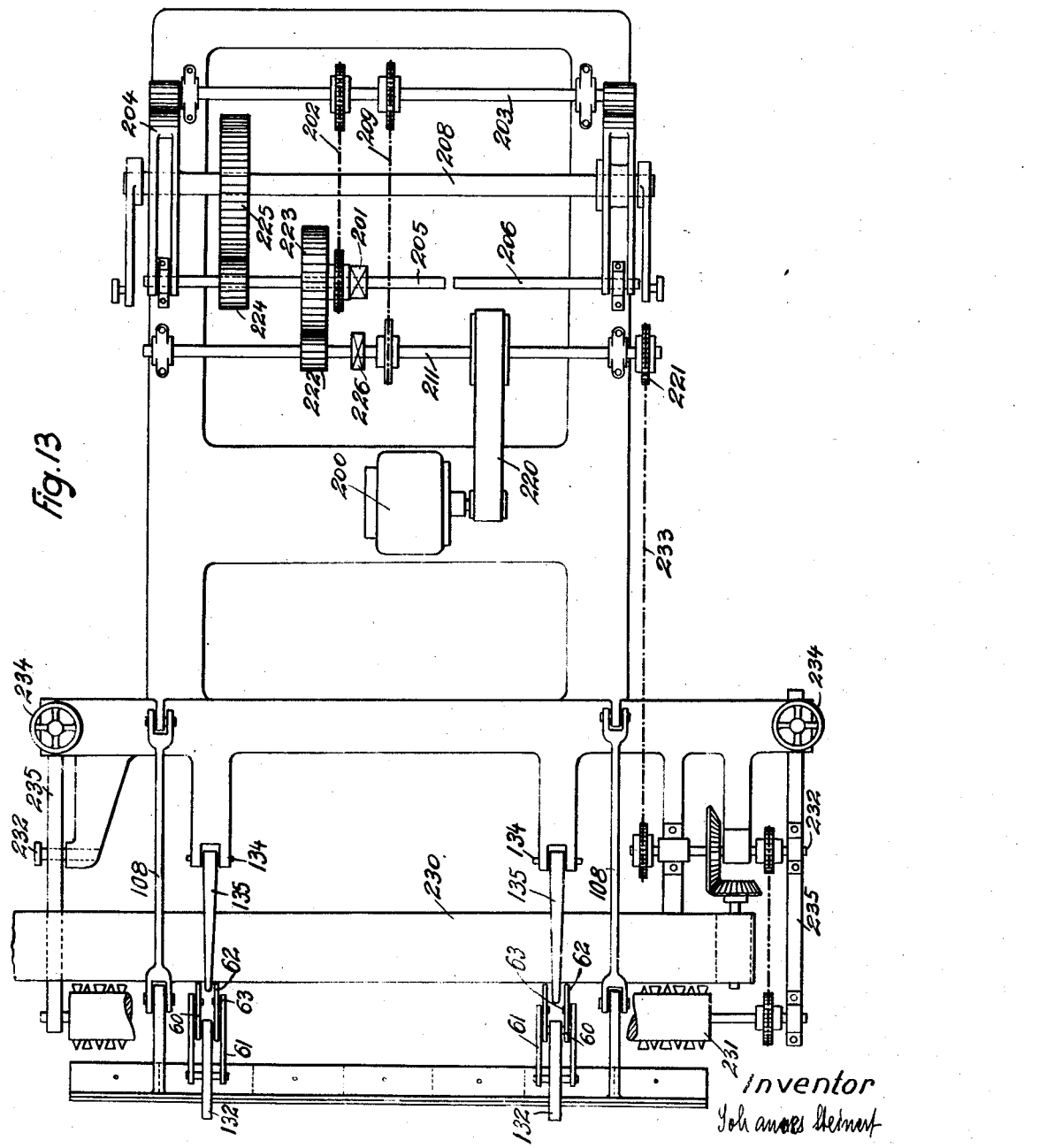

The above mentioned objects and advantages as well as other objects and advantages will be more fully described in the following specification reference being had to the accompanying drawings forming part of this specification, in which:

Figure 1 shows a construction of the machine according to the invention in longitudinal section, the individual parts being shown in the cutting position, Figure 2 is a plan of the machine according to Figure 1, Figure 3 shows the device for moving the ejectors and for lifting the horizontal cutter, Figure 4 is a part front elevation of the ejectors, Figure 5 is a side view thereof, Figure 6 is a side view of a modified construction, Figure 7 is a plan of the machine according to Figure 6, Figures 8 and 9 are side views of a modified ejecting device and illustrate their operation, Figures 10 and 11 show in side view a further construction of the ejecting device together with the milling roller provided according to the invention, Figure 12 is a side view of a further construction of the machine, Figure 13 is a plan of Figure 12, and Figure 14 shows on a larger scale the mechanism whereby the crank shaft can be raised and lowered.

In the construction according to Figures 1-5, bearings 12, 12', in which coupling rods 17, 17' are swingably arranged, are mounted on the rear end of a caterpillar carriage 15. Arranged on the rear part of the coupling rods 17, 17' is a crank shaft 13 with the cranks 1, 1' which is adapted to be rotated by a driving engine A by way of the lay shaft B, the gear wheel D disengaged by means of the clutch C and the gear wheel 14. By means of the crank rods 2, 2' the cranks 1, 1' swing the bell-crank levers 3, 3' connected at 10, 10' to the coupling rods 17, 17' by means of a rocking shaft, and connected to said bell-crank levers at 5, 5' are the cutter beams 7, 7' to which an up and down movement is thereby imparted. The cutter beams 7, 7' which are preferably bent inwardly at an obtuse angle, are pivoted at 7a, 7b to links 6, 6' which are adapted to turn on pivots 9, 9' arranged on the coupling rods 16, 16'. The coupling rods 16, 16' are connected by the links 18, 18' to the coupling rods 17, 17' and are adapted to rotate on the caterpillar carriage at 11, 11'. By means of such an arrangement the cutter system is moved in a curved path 29 and during its upward movement is lifted into a position above the conveyor device 30. The center C of the curved path 29 is situated in the mass of peat below the machine.

The entire lever system may be swung downwardly by means of toothed segments 19, 19', mounted on the coupling rods 16, 16', and corresponding pinions 20, 20'. The speed of rotation of said pinions is related to the speed of the cranks 1, 1', so that each crank rotation causing an upward and downward movement of the cutter system corresponds to a lowering of the cutter system by the thickness of one sod.

After cutting out the lowermost strip of peat the crank shaft with the cutter system is uncoupled and the entire link beam system is raised, the caterpillar carriage being simultaneously moved back in known manner by the width of one sod by means of a draw bar. The raising of the system may be effected for example by means of chains 21, 21', running over suitably provided sprocket wheels mounted on the shaft 11a, the chains 21, 21' being provided with dogs 22, 22', pinions provided with free wheel action rotating backwardly. The vertical cutter 34 is provided with vertical cross-cutters 35 corresponding to the length of the sods. Said cross-cutters 35 are mounted at right angles to the cutter 34. Each chamber thus formed contains an ejecting device 31, 33 which is held in its upper position by a spring 36.

For moving the ejectors mounted on the vertical cutter there is provided a lever system 23 mounted on the caterpillar carriage (see Figure 3) and having noses 24, said system being adjusted according to the depth of cut by means of the coupling rods 16, 16' by way of the link system 26, 27 mounted at 26a on the caterpillar carriage, in order to eject the peat sods always above the conveyor band 30.

During the ascent of the cutter beam, the noses 24 press against the curved pressing surface 8a of the horizontal cutter 8, so that the latter engages the pawl 28. During the descent, the pawl 28 is released from the locking position adjusted by means of the spring 28a by a cable 32 secured to the link 6. As the angle α increases during the descent of the vertical cutter, the moment of release can be determined by selecting the length of the cable 32.

As with a constant uniform drive, the rate of cutting diminishes towards the dead centre of the crank 1, and as this is rather harmful in the case of a bog containing much fibre, the movement of the cutter system may, after having attained the maximum speed obtainable by the crank drive, be accelerated still further by the arrangement of a freewheel-mechanism 14a between the gear wheel 14 and the shaft 13 connected with the crank-drives, so that during the last part of the cutting movement the freewheel-mechanism 14a releases the crank-devices from the driving wheel gear 14 and the cutter system is accelerated further by its own weight. If in the case of certain bogs this powerful blow caused by the free fall of the cutter system is to be avoided, the optimum force of blow can be adjusted in each case by means of a regulatable brake device 13a acting on the shaft 13 connected to the crank devices. In its dead center position the crank always represents the limit for the blow of the vertical cutter. By rotating this crank beyond the dead center, the vertical cutter is raised without any jerking.

The machine may be driven for example by a steam engine, an electric motor or an internal combustion engine.

In the construction according to Figures 6 to 9, the upward and downward movement of the entire cutter driving system may, in accordance with the position of the layer of sods to be cut, be obviated by varying relatively to the vertical the position of the rocking angle of the bell-crank lever turning about a stationary axis. In the embodiment shown in Figs. 6 to 9, a frame 102 is mounted on the caterpillar carriage 101 and bell-crank levers 104, 104' are pivoted to said frame at 103, 103'. Pivoted to the bell-crank levers at 105, 105' are the cutter beams 106, 106', which are guided by the links 108, 108' pivoted to the frame 102 at 107, 107'. Laid over the arcuate members 110, 110', extending from the bell-crank lever 104 and supported by rods 109, 109', are belts 112, 112' which are attached to said arcuate members at 111, 111' and which pass between the pairs of rollers 113, 114 and 113', 114' respectively. The rollers 114, 114' have a recess a, the effect of which is that during each revolution of the rollers, the belt is for a certain time not gripped by the rollers. The pairs of rollers are rotated in opposite directions by the motor 115 through the belt pulley 116, a disengageable clutch 117 and the worms 118 and 119 respectively.

When the circular arcuate members 110, 110' are in the dotted line position, the springs 120, 120' are tensioned. If the pairs of rollers 113, 114 and 113', 114' no longer grip the belts 112, 112', the springs impart to the arcuate members 110, 110', the bell-crank levers 104, 104' and hence the now descending cutter system an acceleration depending upon the degree of tensioning of the springs. This spring tension may be varied by means of the adjusting screws 121, 121'.

After the cutting operation which just occupies the time during which the belts 112, 112' are not gripped by the pairs of rollers 113, 114 and 113', 114', the cutter system is lifted and carried above the conveyor device 122 (Figure 6) or 143 (Figures 8 and 9), above which the ejection of the cut peat sods proceeds.

The worms 118 and 119 are constructed to be self-locking on the disengagement of the clutch 117, so that the driver rollers hold the belts until the clutch has been re-engaged.

The ejecting device according to a further feature of the present invention is constructed so that the sods are always ejected at the same height above the conveyor band, the ejecting movement being produced solely by the movement of the cutter system.

Connected to the vertical cutter 124 are crosscutters 125 corresponding to the length of the sod. Each of the chambers thus formed accommodates an ejecting device 123, the shank 126 of which is guided by suitable guide plates 127, 128. Between one guide plate 128 and an abutment 129 provided on the shank 126 of the ejecting device is a spring 130, which tends to force the ejecting device out of the chamber.

By the impact of the cutter system on the surface of the peat, the ejecting device is forced upwardly and is held in the upper position by means of the lever 131 engaging a corresponding recess 126a in the shank of the ejecting device.

The ejectors may also be drawn upwardly by means of a cable (indicated in dotted lines at 158), which is secured to the ejectors and is operated by the lever 156 pivoted at 157 to the cutter beam 106.

The horizontal cutter 132 pivoted to the cutter beam 106 has a recess 133 and the latter, during the upward movement, is engaged by the lever 135 which is pivoted to the frame 102 at 134 and hooks the horizontal cutter in the pawl 137 by means of the hook 136. During the downward movement, the lever 135 is held in the horizontal position by the brackets 135a. The pawl 137 is pivoted at 139 to the frame 138 secured to the cutter beam 106 and is drawn towards the cutter beam by the spring 140. During the downward movement the pawl is disengaged from the horizontal cutter at a suitable position by means of the cable or chain 141, so that the horizontal cutter descends by its own weight.

In the movement of the horizontal cutter 132 to its raised position, the lever 131 is rotated by means of the pawl 142 pivoted to the horizontal cutter so that the shanks of the ejecting devices are released and the ejectors 123 forced downwardly by the springs 130 eject the peat sods on to the endless conveyor band 143, which is mounted in a suitable frame 144, 145 of the caterpillar carriage.

In the construction of the ejecting device according to Figures 10 and 11, the ejectors 126 are held in the raised position by springs 130 during the cutting operation. During the upward movement of the cutter system, the horizontal cutter 132 is lifted by the push rod 135, the push rod pressing into the corner of the box-shaped attachment 60 of the horizontal cutter 132. The attachment 60 has at 62 an arcuate slot in which a pin 63 is adapted to slide. The pin 63 is pivotally connected to the ejector 126 by the rod 61. As can be seen from Figure 11, upon the raising of the horizontal cutter 62, the ejector 126 is forced downwardly by the pin 63 abutting against the upper edge of the slot 62, so that the peat sods fall on to the conveyor band 230. This conveyor band 230 is moved by a bevel wheel gear driven from the motor of the machine.

Experience has shown that it is extremely difficult and often quite impossible with the known box-shaped cutters, to convey the so-called "ling" ground with its grass and heather to the conveyer band and furthermore, the ling ground (waste) should not be forwarded to the drying field where the peat sods are to be dried, but the waste should be returned into the pit from which the peat has been cut. It is also desirable not to throw the waste into the pit in large pieces but in a fine uniform dispersion so that the surface of the bog for the second peat cutting will be as even as possible. For this purpose I provide the cutting roller 231, which is secured to the machine frame by suitable bearing brackets, is as long as the vertical cutter and is set in rapid rotation. As soon as the caterpillar carriage has been moved back by the width of one sod, the roller cuts the "ling" or waste, as shown in Figure 11, and flings it into the cut pit. The cutting roller is vertically adjustable, so that it can remove more or less of the waste ground according to the nature of the surface of the bog. By means of guide plates not shown it is also possible to ensure that the ground removed will be conveyed with certainty into the pit.

In the construction shown in Figures 12 to 14, the motor 200 drives by way of the belt 220 the continuously rotating shaft 211. Rigidly keyed to this shaft is the sprocket wheel 221 which by means of the chain 233 and the gear shaft 232 drives the conveyor band 230 by way of a bevel wheel gear, and the cutting roller 231 by way of a further chain with corresponding sprocket wheels. Loosely mounted on the shaft 211 is, furthermore, the pinion 222 which is connected to the crank shaft 209 by the gear wheels 223, 224, 225 and is adapted to be coupled to the shaft by the clutch 226.

During the cutting operation (see Figure 14), the clutch 201 on the shaft 205 is engaged, whereby the chain drive 202 and hence the shaft 203 carrying the pinions are rotated. The latter engage the toothed segments 204, which rotate on the shaft 205, 206 and in their center carry the bearings 207 of the crank shaft 208.

Engaging the shaft 203 carrying the pinions is a second chain drive 209 leading to the clutch 210. This clutch is likewise mounted on the shaft 211, which rotates in a direction opposite to that of the shaft 205.

Thus, by engaging the clutch 201, it is possible to move the crank shaft upwardly and parallel to itself about the shafts 205, 206, and by engaging the clutch 210 to move it downwardly again.

The operating levers, not shown, of the clutches 226, 201 and 210 are connected together so that the clutches 226 and 201 can only be engaged and disengaged simultaneously while clutch 210 is actuated conversely.

The pinion 222 is rigidly connected to one side of the laminated brake 227 and a ratchet wheel 228, while the other side of the laminated brake 227 is connected to the machine frame.

When the laminated brake 227 is released, the cutter system can descend freely, driving with it the crank shaft 208 and the gear wheels 225, 224, 223, 222 and lifting the ratchet pawl 229. By partly engaging the laminated brake, the free descent can be braked and by full braking, the crank and the vertical cutter can be held in any desired position.

The two hand wheels 234, on which are mounted threaded spindles, serve to rotate the levers 235, carrying the milling roller 231, about the spindles 232, 232' and thereby to raise or lower the milling roller.

By rotating the crank shaft parallel to itself about the shafts 205, 206, the swinging angle of the bell-crank lever is given a different position relatively to the vertical, so that therefore, the further the crank shaft is raised, the lower the cutter system is pressed downwardly, and thereby rows of sods situated one below the other can be cut successively from the wall of peat. When a wall of peat has been removed, the entire machine is moved back by the width of one sod, the crank shaft being moved simultaneously into its lowest position, whereupon the cutting operation may recommence.

I claim:

1. A machine for cutting, lifting and conveying peat sods, comprising a cutter system consisting of horizontal and vertical knives adapted to cut one horizontal and three vertical sides of the peat sods, a movable beam carrying said cutter system at one end thereof, a mechanism connected to said beam for causing upward and downward movements of said cutter system, and guiding means connected to an intermediate point of said beam, said guiding means being adapted to guide said cutter system during said upward and downward movements in a path of a continuous curve one end of which lies above a conveyor device and the center of curvature of which is situated in the mass of peat below the machine.

2. A machine as set forth in claim 1, in which the beam carrying said cutter system is connected to one arm of a bell-crank lever pivoted about a horizontal axis and guided by a link adapted to pivot about a second horizontal axis.

3. A machine as set forth in claim 1, in which said cutter system is acuated by a bell-crank lever, one arm of which is connected to the beam carrying said cutter system and a second arm of said bell-crank lever is connected by way of a rod to a crank.

4. A machine as claimed in claim 1, in which the beam carrying said cutter system is acuated by a bell-crank lever, one arm of which is connected to the beam, a crank-mechanism, a second arm of said bell-crank lever being connected to said crank-mechanism, a driving device, a freewheel-mechanism being arranged between said driving device and said crank-mechanism, said crank-mechanism being adapted to impart an accelerated movement to said cutter system during the first part of its downward movement, said freewheel-mechanism being adapted to release said crank-mechanism from said driving device when said cutting system has reached the maximum speed obtainable by said crank-mechanism, whereby the movement of the cutter system is accelerated further by its own weight, and a regulating brake operatively associated with the crank-mechanism for the adjustment of the magnitude of the acceleration.

5. A machine as set forth in claim 1, in which said cutter system is actuated by a pivoted bell-crank lever and guided by a pivoted link, the pivot points of said bell-crank lever and said link being connected together by a rod and mounted on coupling rods adapted to be swung about different stationary points for the purpose of obtaining different depths of cuts.

6. A machine as set forth in claim 1, in which said cutter system is actuated by a pivoted bell-crank lever and guided by a pivoted link, the pivots of said bell-crank lever and said link being connected together by a rod and raised by a driving device after the maximum depths of cut is attained and after which the machine is moved to the rear by the width of one sod, the crank being disengaged at that time.

7. A machine as set forth in claim 1, in which the beam carrying said cutter system is connected to one arm of a bell-crank lever pivoted about a stationary horizontal axis and guided by a link adapted to pivot about a second stationary horizontal axis, the position of the rocking angle formed between said bell-crank lever and the vertical plane being altered for obtaining different depths of cut.

8. A machine as set forth in claim 1, in which a bell-crank lever pivotally mounted upon a stationary horizontal axis is used to actuate said cutter system and to which a tension element is secured which periodically is driven by a driving device and then released.

9. A machine as set forth in claim 1, in which a bell-crank lever pivotally mounted upon a stationary horizontal axis is used to actuate said cutter system and to which a tension element is secured which periodically is driven by a driving device and then released, said driving device consisting of a pair of rollers provided with a recess at the periphery.

10. A machine as set forth in claim 1, in which the beam carrying said cutter system is connected to one arm of a bell-crank lever pivoted about a stationary horizontal axis and guided by a link adapted to pivot about a second stationary horizontal axis, and in which the position of a crank shaft actuating means for moving said cutter system may parallelly be adjusted to the stationary axis of said bell-crank lever forming part of said means for moving said cutter system.

11. A machine as set forth in claim 1, in which the beam carrying said cutter system is connected to one arm of a bell-crank lever pivoted about a stationary horizontal axis and guided by a link adapted to pivot about a second stationary horizontal axis, and in which the position of a crank shaft actuating means for moving said cutter system may parallelly be adjusted to the axis of said bell-crank lever forming part of said means for moving said cutter system, said crank shaft being rockable about a stationary axis on a carriage carrying the whole arrangement.

12. A machine as set forth in claim 1, in which an adjustable spring is tensioned during the upward movement of said cutter system and imparts an acceleration to the latter during the downward movement.

13. A machine for cutting, lifting and conveying peat sods, comprising a cutter system consisting of horizontal and vertical knives adapted to cut one horizontal and three vertical sides of the peat sods, a movable beam carrying said cutter system at one end thereof, a mechanism connected to said beam for causing upward and downward movements of said cutter system, ejecting devices mounted on said cutter system, and guiding means connected to an intermediate point of said beam, said guiding means being adapted to guide said cutter system during said upward and downward movements in a path of a continuous curve one end of which lies above a delivery device and the center of curvature of which is situated in the mass of peat below the machine.

14. A machine as set forth in claim 13, in which said ejecting devices are operated by stops movably mounted on said machine.

15. A machine as set forth in claim 13, in which said ejecting devices are operated by stops movably mounted on said machine, and a horizontal knife pivoted to the beam carrying the vertical knives is lifted and locked during upward movement of said vertical knives by means of said stop devices acting upon a curved pressure surface operatively associated with the horizontal knife.

16. A machine as claimed in claim 13, the horizontal knife of said cutter system being pivotally connected to said beam and being provided with a curved pressure surface, the vertical knives of said cutter system being rigidly connected to said beam, locking means mounted on said beam for locking said horizontal knife in an elevated position, and a push rod pivotally mounted on the frame of the machine, said push rod being adapted to act upon said curved pressure surface during the upward movement of the cutter system whereby said horizontal knife is rotated into said elevated position for engagement with said locking means, and a portion of said push rod forming stops adapted to actuate said ejecting devices.

17. A machine as set forth in claim 13, in which said ejecting devices are operated by adjustable stops and said stops are moved by a lever- and link-system pivoted about a stationary point and pivotally connected to a coupling rod, said stops being adjusted in dependence on the movement of said coupling rod.

18. A machine as claimed in claim 1, the horizontal knife of said cutter system being pivotally connected to said beam, the vertical knives of said cutter system being rigidly connected to said beam, spring actuated locking means mounted on said beam for locking said horizontal knife in an elevated position, a guiding link one end of which is pivotally mounted on the frame of the machine the other end of which is pivoted to an intermediate point of said beam, and a chain connecting said guiding line with said locking means, said chain being adapted to cause a disengagement of said horizontal knife from said locking means when a predetermined angle between said beam and said guiding link is obtained.

19. A machine as set forth in claim 13, in which said ejectors are acted upon by spring pressure, held in their uppermost position by a double-armed lever and released above a conveyor means by a dog pivoted upon said lever and connected to said cutting device.

20. A machine as set forth in claim 13, in which during lifting of the horizontal cutter said ejecting devices are pressed downwardly by way of a link and a pin sliding in a curved slot provided in an attachment connected to said horizontal cutter.

21. A machine as claimed in claim 1, the vertical knives of said cutter system comprising a longitudinal knife and a plurality of transverse knives, said longitudinal knife being arranged parallel to the front end of the frame of the machine, a cutting roller, said cutting roller being arranged parallel to said longitudinal knife, and means for rotating said cutting roller.

JOHANNES STEINERT.